(12) United States Patent
Rosenthal et al.

(10) Patent No.: US 7,839,509 B2
(45) Date of Patent: Nov. 23, 2010

(54) METHOD OF MEASURING DEEP TRENCHES WITH MODEL-BASED OPTICAL SPECTROSCOPY

(75) Inventors: Peter Rosenthal, West Simsbury, CT (US); Carlos A. Duran, Canton, NY (US); Alexei Maznev, Natick, MA (US); Alexander Mazurenko, Dedham, MA (US)

(73) Assignee: Advanced Metrology Systems LLC, Natick, MA (US)

( * ) Notice: Subject to any disclaimer, the term of this patent is extended or adjusted under 35 U.S.C. 154(b) by 255 days.

(21) Appl. No.: 11/994,763

(22) PCT Filed: Jun. 30, 2006

(86) PCT No.: PCT/IB2006/052211

§ 371 (c)(1),
(2), (4) Date: Aug. 20, 2008

(87) PCT Pub. No.: WO2007/004177

PCT Pub. Date: Jan. 11, 2007

(65) Prior Publication Data

US 2009/0122321 A1      May 14, 2009

Related U.S. Application Data

(60) Provisional application No. 60/696,831, filed on Jul. 6, 2005.

(51) Int. Cl.
*G01B 11/02*    (2006.01)
(52) U.S. Cl. .................................... 356/496
(58) Field of Classification Search ................. 356/496, 356/492, 504, 511, 512, 516; 702/159
See application file for complete search history.

(56) References Cited

U.S. PATENT DOCUMENTS 5,900,633 A * 5/1999 Solomon et al. ....... 250/339.08

* cited by examiner

*Primary Examiner*—Tarifur Chowdhury
*Assistant Examiner*—Jonathon D Cook
(74) *Attorney, Agent, or Firm*—Goodwin Procter LLP

(57) ABSTRACT

The invention represents an improved method of measuring trenches on semiconductor wafers with optical spectroscopy. According to the described method, it is possible to characterize not only depth but also shape of the trench. The advancement is achieved by improved Effective Medium Approximation-based modeling of the optical response of trench structures.

31 Claims, 6 Drawing Sheets

METHOD OF MEASURING DEEP TRENCHES WITH MODEL-BASED OPTICAL SPECTROSCOPY

This application is the national stage of International (PCT) Patent Application Serial No. PCT/IB2006/052211, filed Jun. 30, 2006, and published under PCT Article 21(2) in English, which claims the benefit of and priority to U.S. Patent Application Ser. No. 60/696,831, filed Jul. 6, 2005, each of which is incorporated herein in whole by reference.

The invention represents an improved method of measuring trenches on semiconductor wafers with optical spectroscopy.

Deep trenches formed in a semiconductor material are widely used in the fabrication of integrated circuit devices such as dynamic random access memory chips. Traditionally, trench structures have been controlled by destructive metrology techniques such as cross-sectional scanning electron microscopy (SEM). However, destructive methods are too slow and too expensive for process control in volume manufacturing. In recent years, a nondestructive metrology based on infrared spectroscopic reflectometry has been successfully introduced in process control of deep trench fabrication.

U.S. Pat. Nos. 5,384,639 and 5,392,118, and a paper by T. van Kessel and H. K. Wickramasinghe, "Measurement of trench depth by infrared interferometry", Optics Lett. 24, 1702 (1999), herein incorporated by reference, disclose a method of measuring trench depth with infrared reflectance spectroscopy. This prior art method is based on the interference of light reflected from the bottom of the trench structure and from the surface of the sample. The method requires that the sample be transparent at the optical wavelength used for the measurement and that the trench diameter be much smaller than the wavelength. The trench depth is derived from the distance between interference maxima in the reflectance spectrum.

US Patent Application 2005/0003642 entitled "Method for determining the depth of a buried structure," herein incorporated by reference, discloses an extension of the above method, in which a depth at which a wider trench section begins is determined from a position of a peak in the Fourier-spectrum of the measured spectrum.

A paper by S. Zaidi et al., "FTIR-based non-destructive method for metrology of depths in poly silicon filled trenches", Proc. SPIE Vol. 5038 (2003), p. 185, herein incorporated by reference discloses a further advancement of the technique achieved by introducing a model for theoretical calculations of reflectance spectra of trench structures. In the model, the trench structure is replaced by an equivalent system of homogeneous layers. Each layer is characterized by optical constants derived from the optical constants of the semiconductor substrate and the trench fill material such as air with the help of effective medium approximation (EMA). Thus the problem of calculating a reflectance or ellipsometric spectrum of a trench structure is reduced to a much simpler problem of calculating the spectrum of a multi-layered structure which is well-understood and can be accomplished using methods well-known in the art.

In microelectronic technologies involving deep trenches, such as fabrication of trench capacitors for memory devices, there is a need for a non-contact technique that permits measuring of other trench parameters besides the trench depth. In deep trench memory structures, for example, the capacitance of a cell is directly correlated with both depth and width of the trench. While the trench width at the wafer surface can be inspected with scanning electron microscopy (SEM) or atomic force microscopy (AFM) without destroying the structure, the prior art is not capable of measuring the trench width at the bottom of the structure in a nondestructive way. In deep trench structures with a very high aspect ratio used in the fabrication of trench capacitors in the state-of-the-art memory technology, trench width typically varies from top to bottom of the trench structure. It is important, therefore, to control both top and bottom trench width.

US patent application 2005/0118735, "Method for determining or inspecting a property of a patterned layer" discloses measurement of a lateral dimension or recess volume of a trench structure using infrared reflectometry or ellipsometry and a model similar to that described by Zaidi et al. However, as mentioned above, in deep trench process control measuring a single parameter characterizing a lateral size of the trench is not sufficient as the top and bottom trench width should be controlled independently Additionally, device performance can also be affected by deviations from the straight shape of the trenches such as a bow or narrowing. In extreme cases such deviations may lead to "shorts" between trenches thus causing failure of the memory cells. Determination of statistical characteristics such as trench-to-trench variations in depth and shape is also of practical interest. It is desirable, that multiple parameters of a trench structure be determined simultaneously. A method permitting such simultaneous determination of multiple trench parameters in a non-destructive manner would enable trench memory manufacturers to better control their fabrication process and improve the manufacturing yields.

An obstacle to achieving these objectives with optical spectroscopy was lack of modeling capabilities required to accurately model the measured spectra of the real structures. The EMA method disclosed by Zaidi et al. represents a trench structure by a layered structure consisting of homogeneous layers with sharp interfaces. This model implies an idealized trench structure with straight walls, flat bottoms, and in the absence of trench-to-trench variations in depth. However, even for such an ideal structure, the measured reflectance or ellipsometric spectrum would typically differ from the spectrum calculated by EMA because the lateral period of the trench structures is typically not negligibly small compared to the optical wavelength.

Moreover, in real trench structures, trench width, and, consequently, effective optical properties, are typically vary from top to bottom. Therefore, representation of a trench structure by a layer with fixed values of effective optical constants is not adequate. The bottoms of the trenches are typically not flat, and the trench depth often varies considerably from trench to trench, which means that the representation of the bottom of a trench structure by a sharp interface is inaccurate.

It is, therefore, desirable, to have a method based on advanced modeling capabilities that would permit accurate modeling of the reflectance spectra measured on the real structures and thus permit simultaneous measurement of multiple characteristics of trench structures.

One aspect of the invention includes a method of determining at least one property of a trench structure by: impinging optical radiation on a wafer containing a trench, where the wavelength of the optical radiation is greater than the trench width; receiving electromagnetic response radiation; ascertaining characterization data from the received electromagnetic response radiation arising from the interaction of the incident radiation and the measured sample; selecting an optical model representing the trench structure as a layered structure containing at least one graded layer with gradually varying optical constants; varying at least one parameter of the model to achieve best fit to the characterization data; and determining at least one property of the trench structure.

Another aspect of the invention includes a method of determining at least one property of a trench structure by: impinging optical radiation on a wafer containing said trench, the wavelength of the optical radiation being greater than the trench width; receiving electromagnetic response radiation; ascertaining characterization data from the received electromagnetic response radiation arising from the interaction of the incident radiation and the measured sample; selecting an optical model representing the trench structure as a layered structure containing at least one graded layer with optical constants obtained from the effective medium theory corrected by adding a dispersion term to the refractive index of one of the materials in the layer; varying at least one parameter of the model to achieve best fit to the characterization data; and determining at least one property of the trench structure.

The invention provides many advantages, some of which are elucidated with reference to the embodiments below.

The invention may be more completely understood in reference to the following figures.

Figure 2:
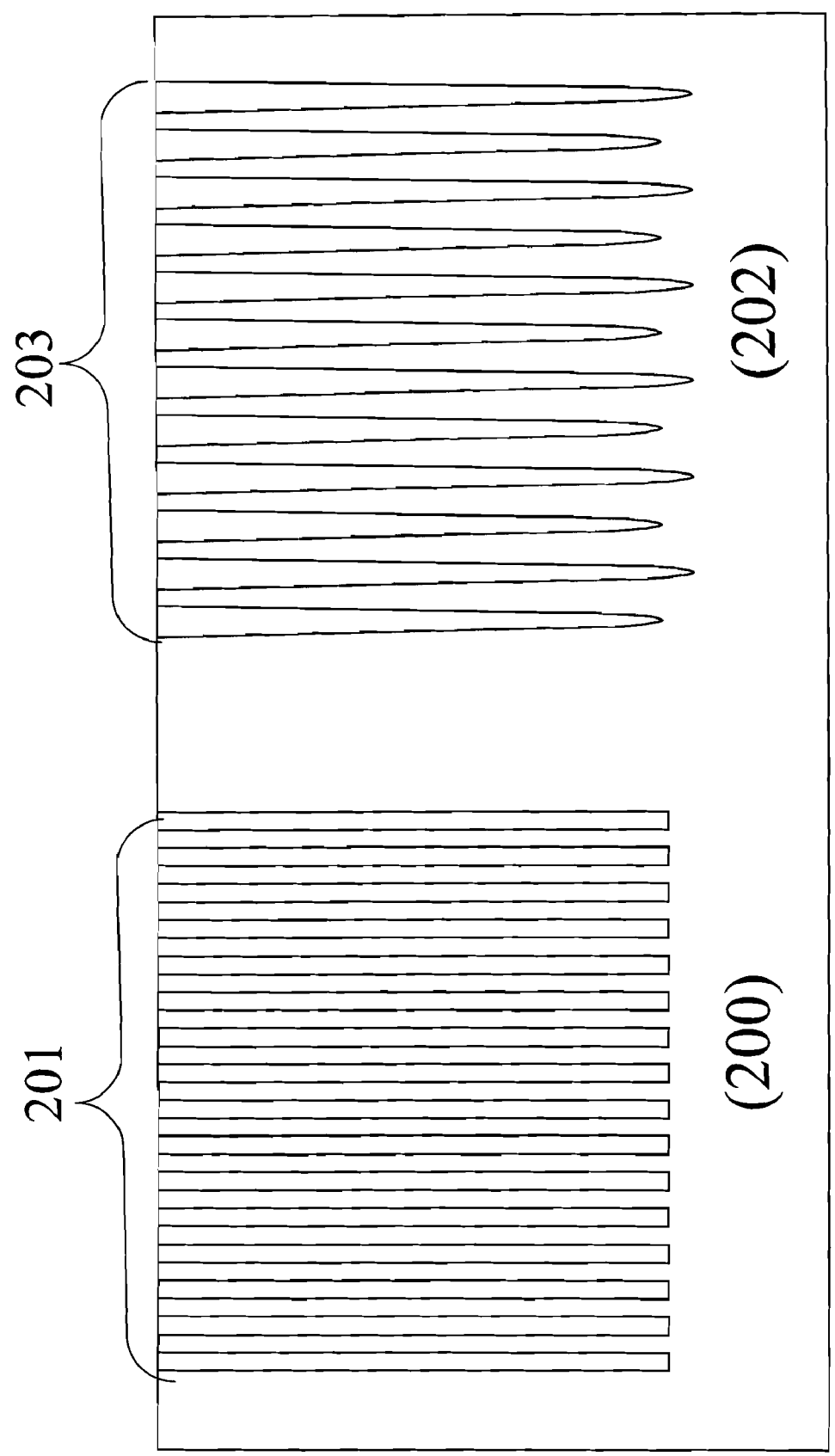
Figure 3A:
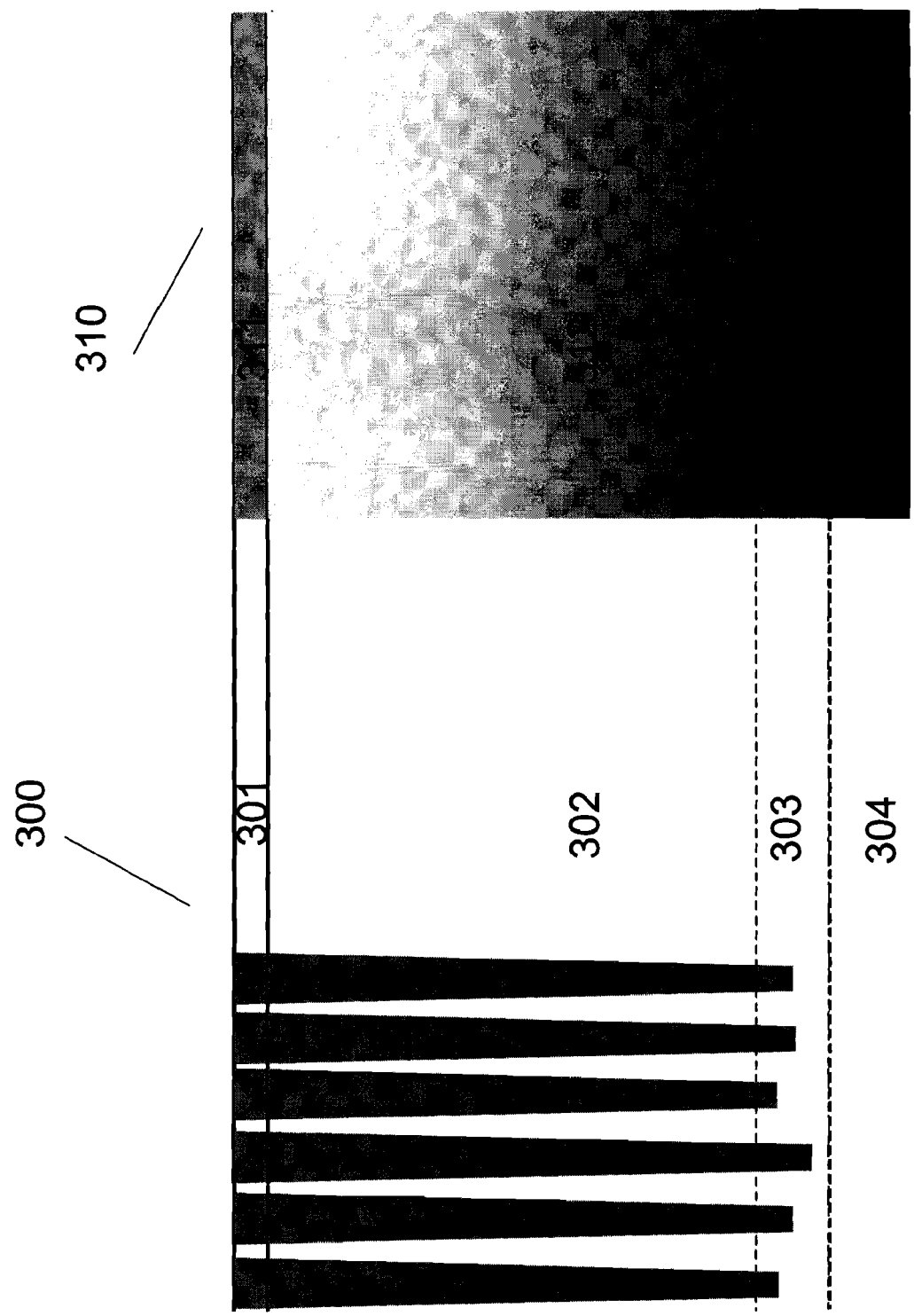

FIG. 2 schematically depicts an idealized and a realistic trench structure;

FIG. 3A depicts a tapered trench model; and

Figure 3B:
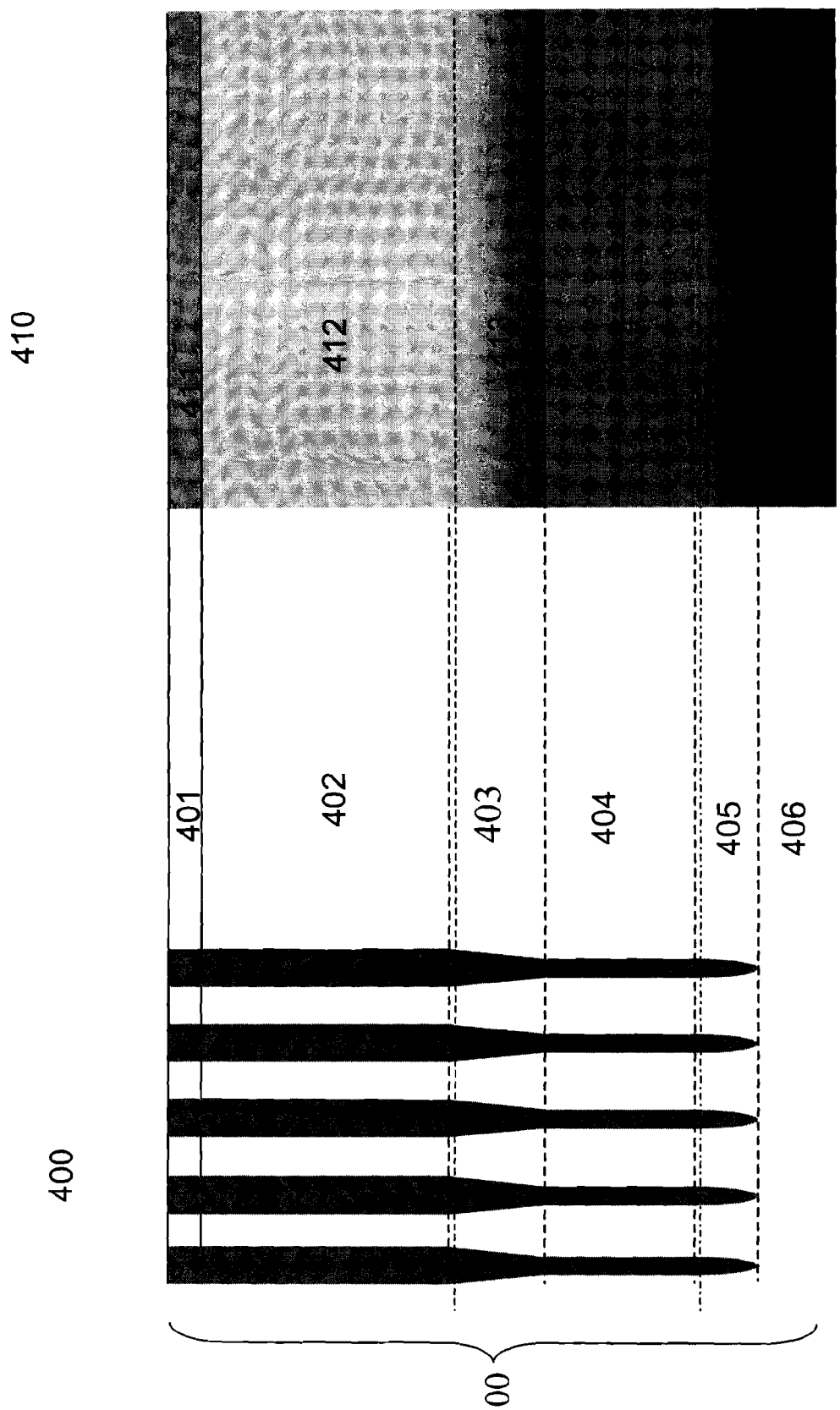
Figure 4:
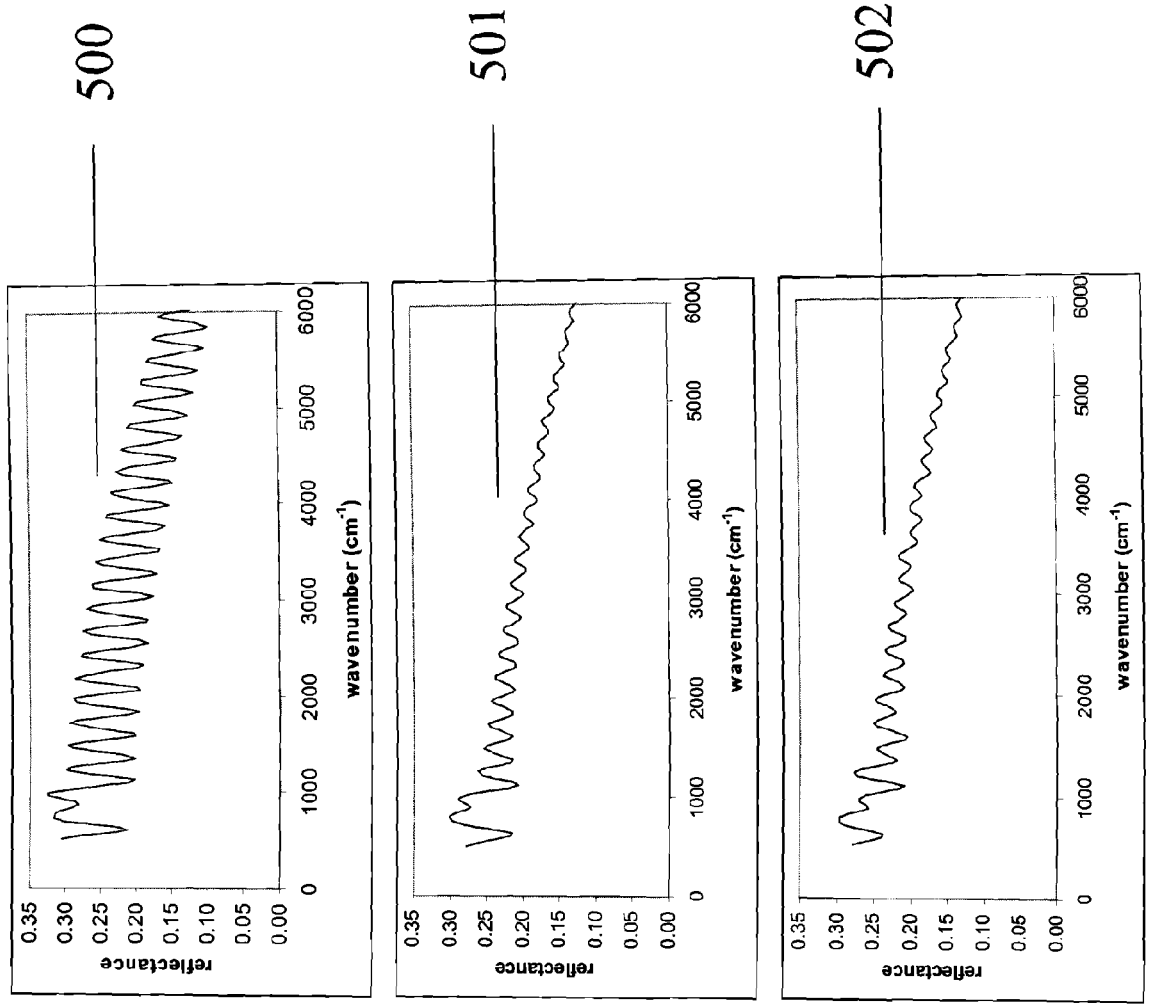

FIG. 3B depicts a two-layer trench model;

FIG. 4 depicts reflectance spectra of a trench structure calculated with the prior art model and with the models constructed according to the current invention.

A method based on advanced modeling capabilities permits simultaneous measurement of multiple characteristics of trench structures in addition to trench depth. The invented method is typically used to measure trench structures fabricated in a silicon wafer. The aforementioned trench structures can comprise linear trenches arranged in a periodic one-dimensional array or wells arranged in a two-dimensional array. The distance between trenches is typically less than 1 μm. Trench width is typically 0.2 μm or less while trench depth can be much larger than its width, e.g., 1-10 μm. Trenches can be partially or fully filled with different materials, for example polysilicon or photoresist.

Preferably, a trench structure is measured with a reflection mode Fourier Transform Infrared (FTIR) spectrometer that impinges radiation on the trench structure with a wavelength range 1.4-20 μm and receives electromagnetic response radiation. Preferably, the apparatus should eliminate the contribution of the optical reflection from the back side of the wafer. Preferably, the apparatus also includes a machine vision system that includes an imaging system and a camera (e.g., a CCD camera). The camera locates a measurement site on a patterned wafer with the aid of a pattern recognition algorithm. The vision system is especially helpful when implementing the method for process control in a semiconductor fabrication facility. An example of the preferred apparatus is the IR3000 system manufactured by Philips AMS.

The measured characterization data, can represent the optical reflectance spectrum of the measured sample and are fitted by model calculations. In the model, the trench structure is represented as a layered system consisting of a combination of homogeneous layers and graded layers (i.e. layers with varying optical constants) on the Si substrate.

As stated above, optical constants of a homogeneous layer are determined using a modified EMA approach. In EMA, effective dielectric constant of a structure consisting of two different materials (i.e. silicon and air for a trench structure) is expressed through the dielectric constants of the constituent materials. Various EMA models can be used, depending on the geometry of the trench structure. For a two-dimensional array of trenches with round or square cross-section, two-dimensional Maxwell-Garnett model provides the most accurate approximation. The effective dielectric function for the polarization perpendicular to the trenches $\in_\perp$ and parallel to the trenches $\in_\parallel$ can be expressed as follows:

$$\varepsilon_\perp = \frac{D}{E} = \varepsilon_1 \left[ 1 - f \frac{2(\varepsilon_1 - \varepsilon_2)}{\varepsilon_1 + \varepsilon_2 + f(\varepsilon_1 - \varepsilon_2)} \right],$$

$$\varepsilon_\parallel = (1 - f)\varepsilon_1 + f\varepsilon_2,$$

where $\in_1$ and $\in_2$ are dielectric functions of the host material (silicon) and the trench fill material (e.g. air), respectively, and f is the volume fraction of the inclusion material which is calculated from the trench width and the number of trenches per unit area of the wafer surface. Other EMA models known in the art such as conventional Maxwell-Garnett or Bruggeman models can be used as well.

Figure 1A:
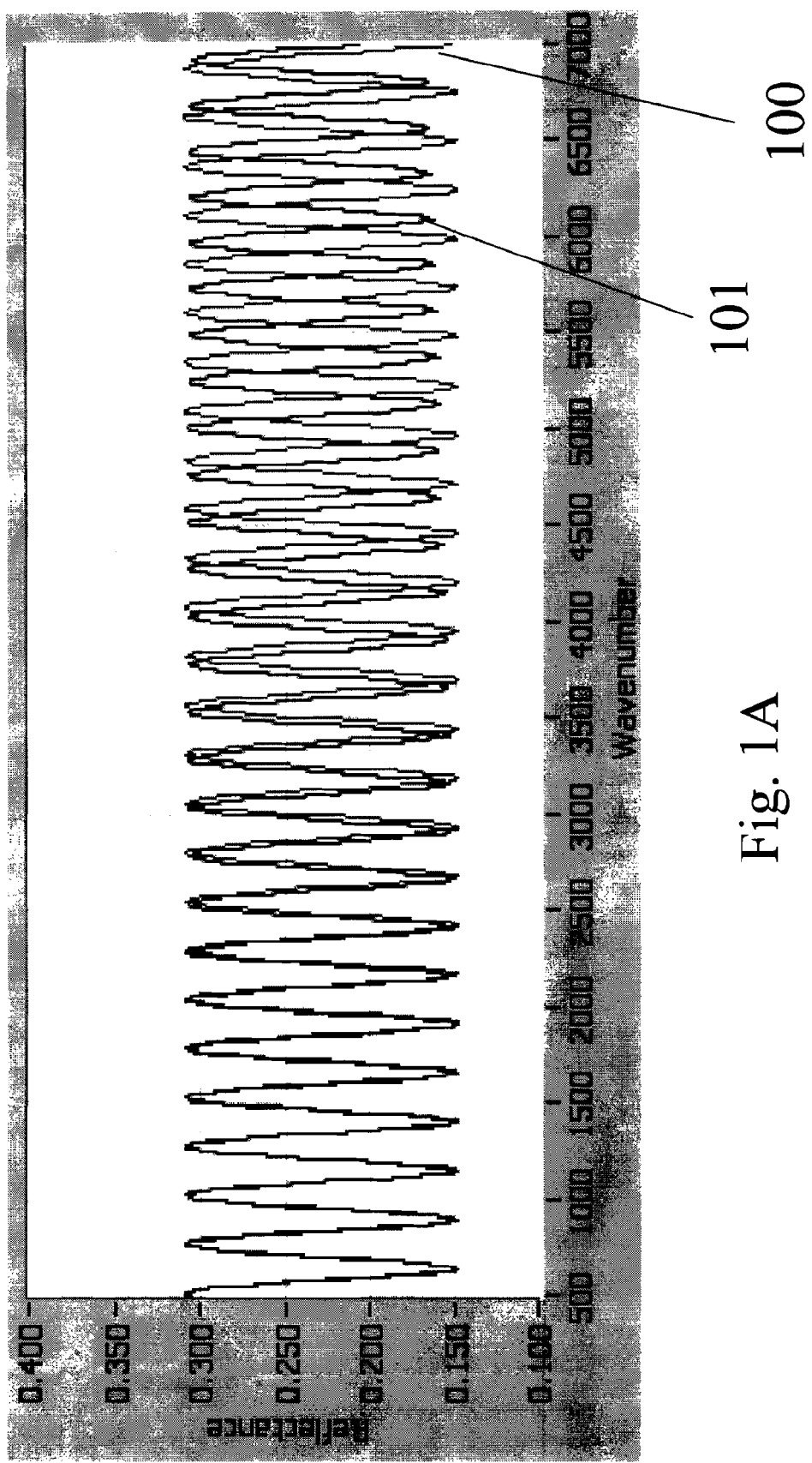
FIG. 1A depicts a reflectance spectrum calculated using EMA in comparison with accurate calculations by the rigorous coupled-wave analysis (RCWA) method.

EMA provides an adequate approximation in the long optical wavelength limit. However, that EMA is inaccurate in modeling the infrared reflectance spectra of the trench structures within the wavelength range of a typical FTIR instrument. The reason is that for the EMA approximation to be valid, the optical wavelength should be much greater compared to both trench width and the distance between trenches. For the state-of-the art trench structures used in microelectronic manufacturing, such as DRAM capacitor structures, this condition is met for the long-wavelength end of a typical FTIR spectral range but is not met for the short-wavelength end. This holds particularly true because due to a high refractive index of silicon, the optical wavelength in silicon is about 3.4 times shorter than the wavelength in vacuum. As a result, at short wavelengths, the period of the interference fringes in an infrared reflectance spectrum of a trench structure deviates from the period predicted by the EMA. FIG. 1A depicts a modeled reflectance spectrum from an array of 7 μm deep trenches having 100×100 nm square cross-section and arranged into a 200×200 nm square lattice. The x-axis corresponds to wave number and the y-axis corresponds to reflectance. Curve 100 represents an EMA modeled spectrum and Curve 101 represents a calculation for the same structure with the rigorous coupled-wave analysis method (RCWA). There is a discrepancy between the idealized EMA modeled curve 100 and RCWA curve 101.

Figure 1B:
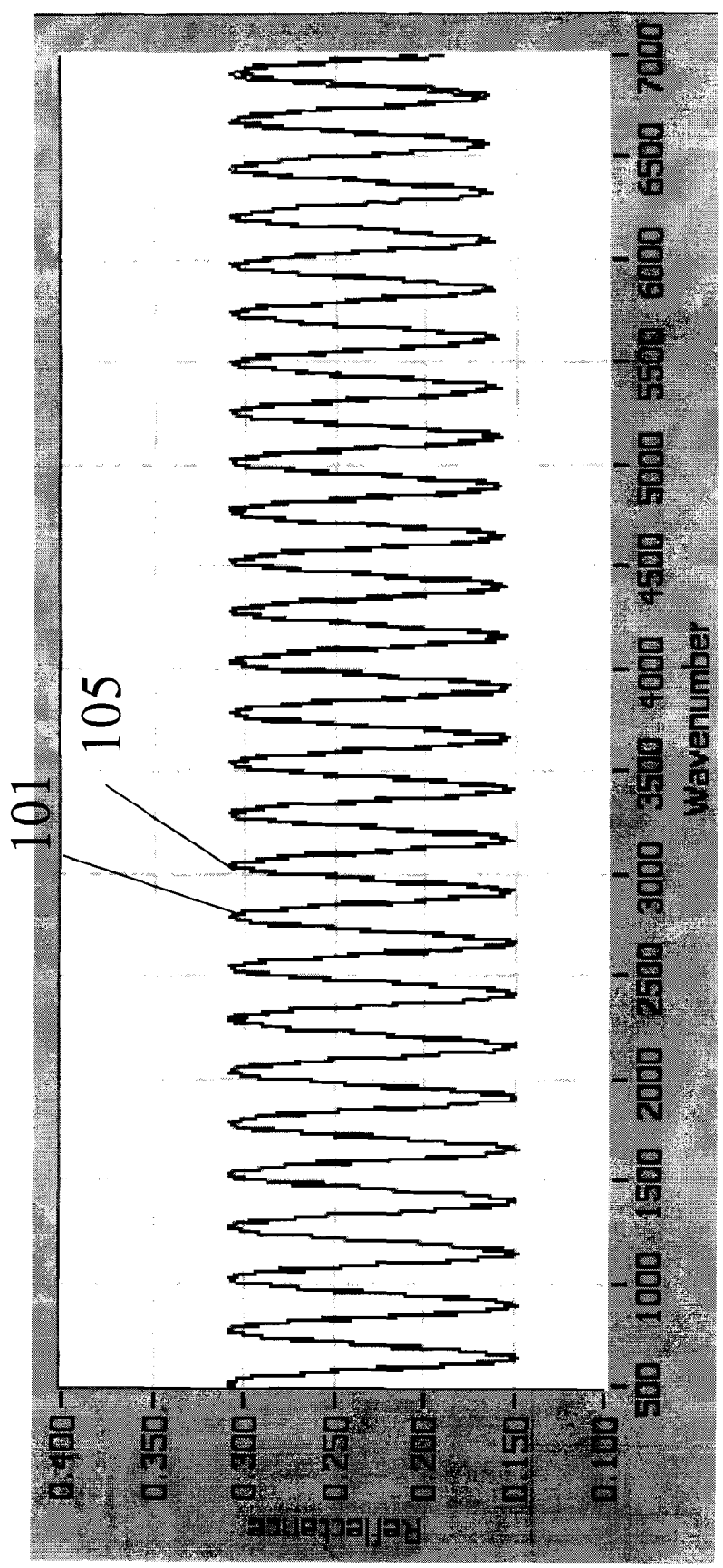
FIG. 1B depicts a reflectance spectrum calculated using a modified EMA with a dispersion term in comparison with accurate calculations by the RCWA method.

According to the current invention, the discrepancy is greatly reduced by adding a small dispersion term to the refractive index $n_2$ of the trench fill material:

$$n_2^* = n_2 + B\nu^2,$$

where $\nu$ is the optical frequency and B is a constant that can be determined either experimentally or with the help of an accurate calculation, e.g. with the RCWA method. FIG. 1B depicts a modeled reflectance spectrum from an array of 7 μm deep trenches having 100×110 nm square cross-section and arranged into a 200×200 nm square lattice. The x-axis corresponds to wave number and the y-axis corresponds to reflectance. Curve 105 represents an EMA modeled structure with a dispersion term and Curve 101 represents an RCWA calculation of the same structure. The curves are substantially identical indicating the modified EMA model that includes a dispersion term to be more accurate for actual measurements than the prior art EMA model.

RCWA calculations show that the modified EMA model composed of homogeneous layers with sharp interfaces should be adequate for straight trenches with a flat bottom. However, such model does not work well for real trench structures. The reason for the discrepancy is that real trench shape is typically different from the idealized trench shape represented by the homogeneous layer model. FIG. 2 depicts an idealized trench structure in area 200. The trenches have straight walls and flat bottoms, and trench-to-trench variations are absent.

Area 202 depicts a more realistic series of trenches 203. These trenches are tapered, that is their width varies from top to bottom. At the bottom trenches do not terminate abruptly, but typically have a rounded shape. A gradual narrowing at the bottom of the trenches is also typical. In addition, the trench depth varies from trench to trench, which also contributes to the "smearing" of the interface between the trench structure and the silicon substrate. Consequently, the model of an abrupt interface between the trench and silicon substrate fails to adequately describe the optical reflection from the bottom of the trench structure.

According to the current invention, the bottom of the trench structure is represented by a "transition layer" model with gradually changing optical constants. The profile of the dielectric function in the transition layer may be modeled using functional forms such as linear, error function, etc. A profile given by an incomplete beta function with empirically determined parameters yields the best agreement with the experimental data.

The graded layer model can be used not only to describe the interface at the bottom of the trench structure, but also to account for gradual narrowing or broadening of the trenches. FIG. 3A shows a "tapered trench" model. The optical model 310 corresponds to physical structure 300. Layer 311 represents the SiN layer 301. Layer 312 is a graded layer with a linear profile representing trenches with gradually varying width 302. Layer 313 is another transition layer (with a beta-function profile) representing the bottom interface of layer 304. Finally, the semi-infinite substrate layer 314 represents silicon substrate 304.

Sometimes trenches have a more complicated shape, in which case a more complex stack composed of homogeneous and transition layers can be used in the model. FIG. 3B depicts and array of trenches having a narrowing in the middle. The optical model 410 corresponds to physical structure 400. The optical model includes: voided SiN layer 411 corresponding to layer 401, a first voided silicon layer 412 corresponding to top trench layer 402, a graded layer 413 corresponding to trench narrowing 403, a second voided silicon layer 414 corresponding to bottom trench layer 404, a second graded layer 415 corresponding to the trench bottom 405, and a semi-infinite substrate 416 corresponding to silicon substrate 406. Depending on the trench profile, various other combinations of graded and uniform layers can be used to model the structure, and there is no upper bound on the number of layers that can be modeled according to the invention. It is preferable, however, that the model be kept as simple as possible while still representing the physical structure of the trench regions.

FIG. 4 depicts infrared reflection spectra of a trench structure calculated with the prior art model and with modified models constructed according to the current invention. The modeled structure consists of 7 μm deep trenches fabricated in a silicon substrate coated with a 150-nm thick SiN. The average void fraction of the trench structure is assumed to be 20%. The spectrum 500 has been calculated with the model constructed according to the prior art which is comprised of the voided SiN layer, voided silicon layer and the silicon substrate. The spectrum 501 has been obtained with the tapered trench model depicted in FIG. 3A, with trench void fraction gradually changing from 25% to 15% from top to bottom. The spectrum 502 has been calculated with the model depicted in FIG. 3B, with the trench void fraction varying rapidly from 25% to 15% at the middle of the structure. One can see that the spectra 501 and 502 calculated with the advanced models differ significantly from the spectrum 500 calculated with the prior art model. Spectra 501 and 502 are much closer to the spectra measured experimentally on real trench structures.

After an appropriate model is selected, its parameters are varied to achieve the best fit to the experimentally measured reflectance spectrum. For example, for the "tapered trench" model shown in FIG. 3a, the following parameters are typically varied: thickness of the SiN layer 301, trench width at the top of the trench layer 303, trench width at the bottom of the trench layer 303, the trench depth. Thus two parameters characterizing the trench shape, i.e. top and bottom trench widths, can be determined in a single measurement together with the trench depth. The bottom transition width can also be selected as a measured parameter. It is expected to be correlated with the trench-to-trench depth variation which is a useful statistical characteristic of the trench structure.

If trenches are filled with different materials, sections filled with each material are represented in the model as separate layers. For example, one application of the invented method is measuring trenches partially filled with doped polysilicon. In this case the model can be composed of the following layers: transition layer at the bottom of the trench, a homogeneous layer representing the section of the trench filled with polysilicon, transition layer representing the interface between polysilicon and air-filled parts of the trench, another transition layer representing the top part of the trench above the fill (called a recess), and a thin homogeneous layer representing the SiN film with trenches etched through it.

For partially filled trench structures, the measured parameters typically include the depth of the "recess" (i.e. empty section of the trench above the fill), the trench width at the top and bottom of the recess, the thickness and width of the filled sections of the trench, and the thickness of the top SiN layer.

The procedure of fitting an experimentally measured spectrum by a model is performed with a combination of a library search and a gradient-based method such as Levenberg-Marquardt algorithm. A library search provides an initial value for the gradient-based search routine thus preventing the algorithm from converging to a false local minimum. Other global minimization algorithms such as simulated annealing or neural networks can potentially be used as an alternative or a supplement to the library search.

After the fit is completed, the deviation of the calculated best fit spectrum and the calculated spectrum is characterized by the fit error. The value of the fit error characterizes the deviation of the trench shape from the model assumptions. For example, if a trench structure with a narrowing depicted in FIG. 3B is analyzed with a simple tapered trench model depicted in FIG. 3A, the fitting procedure will yield a large fit error. Thus fit error can be used in the process control applications as a useful parameter characterizing irregularities in the trench shape.

A number of enhancements of the invented method are envisioned.

One enhancement of the invented method can be achieved by using polarized light and performing two measurements with different direction of the polarization with respect to the orientation of the trench pattern on the wafer. This approach will be useful for trenches characterized by different width along different axes such as those elliptical or rectangular in cross-section. A polarized measurement is more sensitive to the trench width along the axis perpendicular to the polarization direction. Such a measurement will thus be useful in measuring the elongation of the trench cross-section.

Polarized light can also be used to measure ellipsometric spectra as alternative or in addition to the reflected intensity spectra. Adding ellipsometric measurements will provide additional information about the sample and may help to measure more complex structures and/or determine more parameters simultaneously.

Another enhancement can be achieved by modeling a measured reflectance spectrum by a linear combination of more than one spectra generated by different models. This will be useful, for example, when the measurement spot covers not only the trench array to be measured but also adjacent unpatterned areas (e.g. spaces separating neighboring trench arrays).

Yet another enhancement of the modeling capabilities can be achieved by linking parameters of different layers in the model. For example, if trenches are etched through a thin silicon nitride layer, trench width in said layer can be linked to the top trench width in the Si substrate thus reducing the number of independent variables in the model.

One more enhancement can be achieved by using a "feed-forward" method i.e. setting some parameters in the model to the values obtained in a measurement performed separately using either the apparatus used to practice the current invention such as an IR reflectometer or another metrology tool. For example, the SiN layer thickness can be measured in a neighboring unpatterned area, and then used in the trench structure model.

While advanced modeling is the preferred method in achieving the objectives of the invention, it would also be possible to measure some of the parameters other than the trench depth with the help of either empirical or calculation-based correlation with selected characteristics of the measured spectrum. For example, one can determine the period, amplitude and the decay rate of the fringes in the spectrum. The first parameter will be mostly correlated with the trench depth, the second with the bottom trench width and the third with the trench-to trench variations in depth and width. This method would have an advantage of simplicity while lacking the flexibility and power of the model-based approach.

The invention claimed is:

1. A method of determining at least one property of a trench structure comprising:
   impinging optical radiation on a wafer containing said trench, the wavelength of the optical radiation being greater than the trench width;
   receiving electromagnetic response radiation;
   ascertaining characterization data from the received electromagnetic response radiation arising from the interaction of the incident radiation and the measured sample;
   selecting an optical model representing the trench structure as a layered structure containing at least one graded layer with gradually varying optical constants;
   varying at least one parameter of the model to achieve best fit to the characterization data; and
   determining at least one property of the trench structure, wherein the model contains a graded layer representing tapered trenches with a gradually changing width and another graded layer representing the transition between the bottom of the trench structure and the substrate.

2. The method of claim 1, wherein the optical radiation is in the infrared range.

3. The method of claim 2, wherein the measurement is performed by a Fourier-transform infrared spectroscopy apparatus.

4. The method of claim 1, wherein the characterization data represent the optical reflectance spectrum of the measured sample.

5. The method of claim 1, wherein the incident optical radiation is polarized and the characterization data are ascertained for different polarizations.

6. The method of claim 1, wherein the incident optical radiation is polarized ands the characterization data represent the ellipsometric reflectance spectra of the measured sample.

7. The method of claim 1, wherein the trench structure is a periodic array of trenches having a period smaller than the optical wavelength.

8. The method of claim 1, wherein the trench structure is fabricated in a semiconductor substrate transparent for said optical radiation.

9. The method of claim 1, wherein trenches are at least partially filled by a material different from the substrate material.

10. The method of claim 1, wherein at least one layer in the model is characterized by effective optical constant obtained from the parameters of the trench structure using effective medium theory.

11. The method of claim 1, wherein at least one graded layer represents the transition between the bottom of the trench structure and the substrate.

12. The method of claim 1, wherein at least one graded layer represents a change in the trench width in the middle of the trench structure.

13. The method of claim 12, wherein the model contains a graded layer representing a change in the trench width in the middle of the trench structure and another graded layer representing the transition between the bottom of the trench structure and the substrate.

14. The method of claim 1, wherein the varying step further comprises performing a library search and a gradient-based fitting algorithm, with said library search providing an initial value for the gradient-based fitting.

15. The method of claim 1, wherein the method further comprises determining more than one property of the trench structure.

16. The method of claim 15, wherein the determined properties of the trench structure further comprise trench depth and the top and bottom trench void fraction or trench width.

17. The method of claim 15, wherein one of the determined parameters is trench-to-trench depth variation.

18. The method of claim 15, wherein one of the determined parameters represents the deviation of the trench shape from that assumed in the selected model.

19. The method of claim 18, wherein said deviation is evaluated based on the value of the fit error.

20. A method of determining at least one property of a trench structure comprising:
   impinging optical radiation on a wafer containing said trench, the wavelength of the optical radiation being greater than the trench width;
   receiving electromagnetic response radiation;
   ascertaining characterization data from the received electromagnetic response radiation arising from the interaction of the incident radiation and the measured sample;

selecting an optical model representing the trench structure as a layered structure containing at least one graded layer with optical constants obtained from the effective medium theory corrected by adding a dispersion term to the refractive index of one of the materials in the layer;

varying at least one parameter of the model to achieve best fit to the characterization data; and determining at least one property of the trench structure, wherein the dispersion term is added according to the formula:

$$n_2^* = n_2 + B\nu^2$$

where $\nu$ is the optical frequency, B is a constant that can be determined either experimentally or via rigorous coupled-wave analysis (RCWA) calculation, $n_2$ is the index of refraction of one of the materials comprising the trench structure, and $n_2^*$ is the modified refractive index of said material used in effective medium calculations.

21. The method of claim 20, wherein the optical radiation is in the infrared range.

22. The method of claim 20, wherein a Fourier-transform infrared spectroscopy apparatus performs the measurement.

23. The method of claim 20, wherein the characterization data represent the optical reflectance spectrum of the measured sample.

24. The method of claim 20, wherein the incident optical radiation is polarized and the characterization data are ascertained for different polarizations.

25. The method of claim 20, wherein the incident optical radiation is polarized ands the characterization data represent the ellipsometric reflectance spectra of the measured sample.

26. The method of claim 20, wherein the trench structure is a periodic array of trenches having a period smaller than the optical wavelength.

27. The method of claim 20, wherein the trench structure is fabricated in a semiconductor substrate transparent for said optical radiation.

28. The method of claim 20, wherein trenches are at least partially filled by a material different from the substrate material.

29. The method of claim 20, wherein at least one layer in the model is characterized by effective optical constant obtained from the parameters of the trench structure using effective medium theory.

30. The method of claim 20, wherein the material whose refractive index is modified by adding a dispersion term represents the trench fill material.

31. The method of claim 30, wherein said trench fill material is air, whereby its modified refractive index is given by the formula:

$$n_2^* = 1 + B\nu^2.$$

* * * * *